(12) United States Patent
Bourgeois et al.

(10) Patent No.: US 6,844,100 B2
(45) Date of Patent: Jan. 18, 2005

(54) FUEL CELL STACK AND FUEL CELL MODULE

(75) Inventors: Richard Scott Bourgeois, Albany, NY (US); Anthony Mark Thompson, Niskayuna, NY (US); Curtis Alan Johnson, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 178 days.

(21) Appl. No.: 10/064,886

(22) Filed: Aug. 27, 2002

(65) Prior Publication Data

US 2004/0043278 A1 Mar. 4, 2004

(51) Int. Cl.⁷ .............................................. H01M 2/14
(52) U.S. Cl. ............................. 429/38; 429/30; 429/34; 429/35
(58) Field of Search .............................. 429/30, 34, 35, 429/38

(56) References Cited

U.S. PATENT DOCUMENTS

| | | | |
|---|---|---|---|
| 4,910,100 A | 3/1990 | Nakanishi et al. | |
| 5,532,072 A | 7/1996 | Spaeh et al. | |
| 5,549,983 A | 8/1996 | Yamanis | |
| 5,811,202 A | 9/1998 | Petraglia | |
| 6,045,935 A | 4/2000 | Ketcham et al. | |
| 6,132,895 A | 10/2000 | Pratt et al. | |
| 6,361,892 B1 | 3/2002 | Ruhl et al. | |
| 6,406,807 B1 | 6/2002 | Nelson et al. | |
| 6,444,339 B1 * | 9/2002 | Eshraghi ..................... | 429/26 |
| 2002/0024185 A1 | 2/2002 | Ghosh et al. | |
| 2003/0012997 A1 * | 1/2003 | Hsu ............................ | 429/34 |

FOREIGN PATENT DOCUMENTS

| | | |
|---|---|---|
| DE | 4343914 | 6/1994 |
| JP | 05047408 | 6/1993 |
| WO | 0223660 | 3/2002 |

OTHER PUBLICATIONS

Pending USP Application, Title: "Polygonal Fuel Cell Apparatus and Method of Making", U.S. Appl. No. 10/063,211, filed Mar. 29, 2002.
Pending USP Application, Title: "Interconnect Supported Fuel Cell Assembly, Preform and Method of Fabrication", U.S. Appl. No. 10/166,909, filed Jun. 6, 2002.

* cited by examiner

Primary Examiner—Dah-Wei Yuan
(74) Attorney, Agent, or Firm—Penny A. Clarke; Patrick K. Patnode

(57) ABSTRACT

A fuel cell stack includes at least one fuel cell unit and a number of interconnects defining at least two openings and including at least one flow field for flowing a reagent. Each opening defines a respective fuel manifold, including at least one each of intake and exhaust fuel manifolds. The fuel cell unit includes an anode, a cathode, and an electrolyte disposed therebetween. The anode is adjacent to and in both electrical connection and fluid communication with one of the interconnects, which has a flow field that guides a fuel flow between the intake and exhaust fuel manifolds. The cathode is adjacent to and in both electrical connection and fluid communication with another interconnect with a flow field that guides an oxidant flow. The fuel cell stack includes a perimeter isolation seal and at least two interior isolation seals for sealing the electrolyte to the respective interconnects.

23 Claims, 9 Drawing Sheets

FUEL CELL STACK AND FUEL CELL MODULE

BACKGROUND OF INVENTION

The invention relates generally to fuel cell stacks and modules for power generation, and more particularly, to fuel cell stacks and modules with segregated reactant streams.

Fuel cells, for example solid oxide fuel cells (SOFCs), are energy conversion devices that produce electricity by electrochemically combining a fuel and an oxidant across an ionic conducting layer. The fuel cell operating temperatures depend on the material forming the ionic conducting layer. Desirably, power generation systems incorporating high-temperature fuel cells have the potential for higher efficiencies and power outputs. Exemplary high-temperature fuel cells have operating temperatures above about 600° C., and exemplary SOFCs operate in a range of about 800 to about 1000 degrees Celsius.

A typical fuel cell operates at a potential of less than about one (1) Volt. To achieve sufficient voltages for power generation applications, a number of individual fuel cells are integrated into a larger component. Separation of the oxidant and fuel streams is desirable for multistaging and the use of reactant products by other devices in a power generation system. For lower temperature fuel cells, for example having an operating temperature of less that about 200° C., a large number of elastomer seals in compression may used to separate the two reactants. Elastomer seals cannot withstand the operating temperatures of high-temperature fuel cells, and consequently other materials, such as glass ceramics, must be used to form the seals. However, seal performance remains problematic for high temperature fuel cells, in particular for designs requiring sealing of cell edges or corners or for other joint designs that require maintaining a gap of a certain size during thermal expansion and contraction cycles.

It would therefore be desirable to design a fuel cell stack that maintains separation of the reactant streams, using a reduced number of seals. It would further be desirable to incorporate the fuel cell stack into a fuel cell module having redundant current paths.

SUMMARY OF INVENTION

Briefly, in accordance with one embodiment of the present invention, a fuel cell stack includes a number of interconnects. Each interconnect defines at least two openings and includes at least one flow field for flowing a reagent. Each opening defines a respective fuel manifold, including at least one intake fuel manifold and at least one exhaust fuel manifold. The fuel cell stack further includes at least one fuel cell unit comprising an anode, a cathode, and an electrolyte disposed between the anode and the cathode. The anode is positioned adjacent to a respective one of the interconnects and is configured to be in both electrical connection and fluid communication with the respective interconnect. The flow field of the respective interconnect is configured to guide a fuel flow from the intake fuel manifold to the fuel exhaust manifold. The cathode is positioned adjacent to another respective one of the interconnects and is configured to be in both electrical connection and fluid communication with this interconnect. The flow field of this interconnect is configured to guide an oxidant flow across this interconnect. The fuel cell stack further includes a perimeter isolation seal disposed around the respective one of the interconnects adjacent to the anode. The perimeter isolation seal is disposed on a side of the interconnect facing the anode and is configured to seal the electrolyte to the interconnect. The fuel cell stack further includes at least two interior isolation seals disposed on the respective one of the interconnects adjacent to the cathode and on a side of the respective interconnect facing the cathode. One interior isolation seal surrounds each of the openings and is configured to seal the electrolyte to the respective interconnect.

A fuel cell module is also disclosed. The fuel cell module includes a vessel having an inlet and an outlet, which are configured to receive and exhaust an oxidant, respectively. The fuel cell module also includes at least three fuel cell stacks arranged in a ring within the vessel. The fuel cell stacks separate an inner and an outer volume of the vessel, which volumes are in fluid communication through the fuel cell stacks. At least one of the fuel cell stacks has a fuel inlet, and at least one of the fuel cell stacks has a fuel outlet for receiving and exhausting a fuel flow, respectively. Each fuel cell stack includes at least two fuel manifolds, for receiving and exhausting the fuel flow, and at least one planar, high-temperature fuel cell unit comprising an anode, a cathode, and an electrolyte disposed between the anode and the cathode. Each fuel cell stack further includes a number of compressive seals for segregating the cathode and the fuel flow through the fuel manifolds and for segregating the anode and the oxidant. The fuel cell module also includes a number of electrical connections between the fuel cell stacks for electrically connecting each fuel cell stack to at least one other fuel cell stack.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
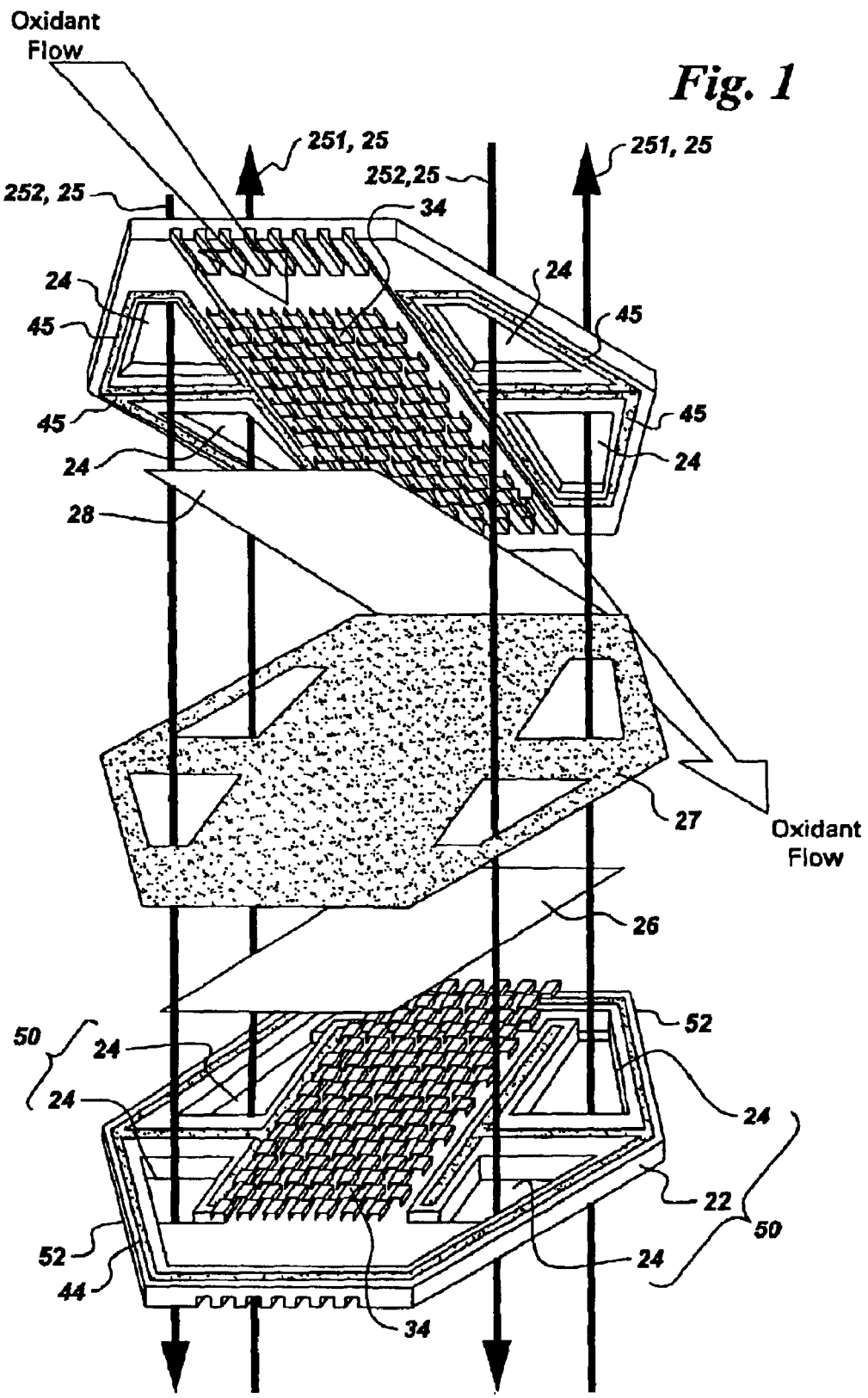
FIG. 1 illustrates a planar fuel cell unit in exploded view.

A fuel cell stack 10 embodiment of the invention is described with reference to FIGS. 1 and 2. As shown in FIG. 2, fuel cell stack 10 includes a number of interconnects 22, each interconnect 22 defining at least two openings 24 in the plane of the interconnect 22, with each opening 24 defining a respective fuel manifold 25. As indicated in FIG. 1 by arrows, the fuel manifolds 25 include at least one intake fuel manifold 251 and at least one exhaust fuel manifold 252.

Figure 2:
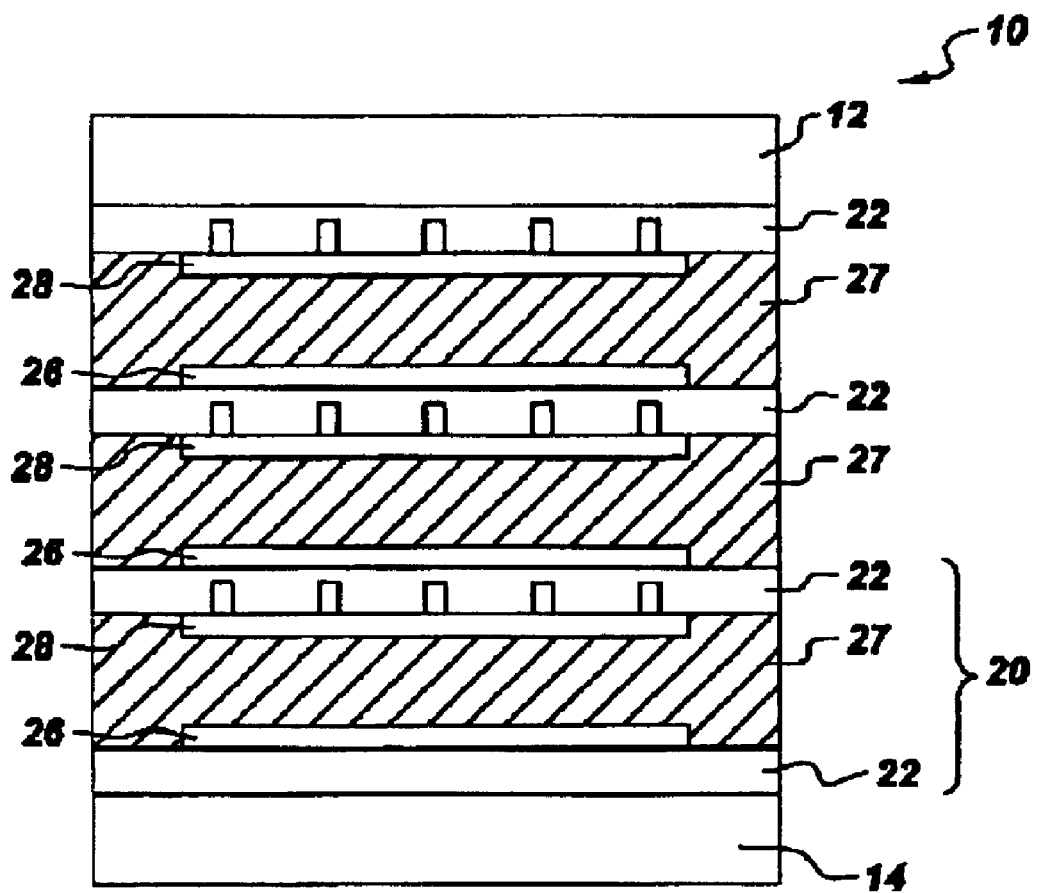
FIG. 2 depicts a fuel cell stack embodiment of the invention in cross-sectional view.

Although depicted in FIG. 1 as being parallel in opposite directions, intake and exhaust manifolds 251, 252 may also be parallel in the same direction or perpendicular. For the particular embodiment depicted in FIG. 1, each interconnect defines four, symmetrically arranged openings 24, which in turn define four fuel manifolds 25, for symmetric distribution of fuel within fuel cell stack 10. Each interconnect 22 also includes at least one flow field 34 for flowing a reagent, such as an oxidant or a fuel, across interconnect 22. Exemplary flow fields 34 are formed from metals that possess the requisite electrical conductivity, resist oxidation, maintain mechanical strength and are chemically stable under the operating conditions of the fuel cell. For example, for operating temperatures below 750–800° C., the flow fields 34 could be stamped from metals compositions based on ferritic, stainless steels. Further, the exemplary flow fields 34 are fit into a channel in interconnect 22 or form an integral part of interconnect 22.

Fuel cell stack 10 also includes at least one fuel cell unit 20 comprising an anode 26, a cathode 28, and an electrolyte 27 disposed between the anode and the cathode. Exemplary electrolytes 27 are impermeable with respect to both the fuel and the oxidant. For example, for proton exchange membrane (PEM) or SOFC fuel cells 20, exemplary electrolytes 27 are solid electrolytes 27, such as ion-conducting ceramic or polymer membranes. One exemplary planar fuel cell unit 20 is a solid oxide fuel cell 20, with an oxygen-ion conducting solid electrolyte, such as yttria stabilized zirconia (YSZ), ceria-doped zirconia, or lanthanum strontium gallium manganate (LSGM).

The anode 26 is positioned adjacent to a respective interconnect 22 and is configured to be in both electrical connection and fluid communication with interconnect 22. For the embodiment illustrated in FIG. 1, flow field 34 supplies both the electrical connection and fluid communication. As indicated in FIG. 1, the flow field 34 of this respective interconnect 22 is configured to guide a fuel flow from at least one intake fuel manifold 251 to at least one fuel exhaust manifold 252, over the surface of anode 26.

The cathode 28 is positioned adjacent to a respective interconnect 22 and is configured to be in both electrical connection and fluid communication with interconnect 22. As indicated in FIG. 1, the flow field 34 of this respective interconnect 22 provides the electrical connection to cathode 28 and is configured to guide an oxidant flow across the interconnect 22 and over the surface of cathode 28. One exemplary oxidant is air.

In addition, fuel cell stack 10 includes a perimeter isolation seal 44 disposed around the interconnect 22 that is adjacent to anode 26. For the particular embodiment shown in FIG. 1, perimeter isolation seal 44 also extends inward between openings 24. As indicated in FIG. 1, the perimeter isolation seal 44 is disposed on a side of the interconnect 22 that faces the anode 26 and is configured to seal the electrolyte 27 to the interconnect 22. Beneficially, perimeter isolation seal 44 shields anode 26 from the oxidant surrounding planar fuel cell unit 20. To shield cathode 28 from the fuel flow through fuel manifolds 25, fuel cell stack 10 also includes at least two interior isolation seals 45 disposed on the interconnect 22 adjacent to the cathode 28 and on a side of the interconnect 22 facing the cathode 28, as indicated in FIG. 1. As shown, one interior isolation seal 45 surrounds each opening 24 and seals the electrolyte 27 to the interconnect 22. Beneficially, seals 44, 45 are compressive, as indicated in FIG. 1, as compared to the edge seals (not shown) found on typical planar stack designs (not shown). By "compressive," it is meant that seals 44, 45 deform when placed in compression, either from the weight of the stack 10 or a mechanical means, such as tie bolts, to provide a better seal. In order to generate a larger voltage across the stack 10, fuel cell stack 10 includes a number of planar fuel cell units 20 arranged in a vertical stack, according to a particular embodiment. As will be recognized by those skilled in the art, the particular configuration of three (3) planar fuel cell units 20 shown in FIG. 2 is for illustrative purposes only, and the specific number of planar fuel cell units 20 included in the stack 10 will vary depending on the power requirements of the stack 10. For the particular embodiment illustrated in FIG. 2, each of the two pairs of adjacent planar fuel cell units 20 shares an interconnect 22, with the interconnect 22 being adjacent and electrically connected to and in fluid communication with the anode 26 of one of the adjacent planar fuel cell units 20 and with the cathode 28 of the other adjacent planar fuel cell unit 20. For this particular embodiment, each of the interconnects 22, which is shared by the adjacent planar fuel cell units 20, includes a flow field 34 on each side of the interconnect 22, for electrical connection and to provide fluid communication for the adjacent anode 26 and cathode 28 of the neighboring planar fuel cell units 20.

According to a particular embodiment, each planar fuel cell unit 20 is polygonal, as shown for example in FIG. 1. Beneficially, polygonal configurations of fuel cell units 20 are relatively easy to manufacture and permit the minimal yet robust sealing arrangements discussed above. For example, corner stack seal 43, shown for example in FIGS. 3 and 4, need not be completely hermetic but must only provide sufficient resistance to the reactant flow through the stack 10 to maintain the separation of inlet and outlet oxidant flows. For example, corner stack seals 43 may be "leaky seals," that is non-hermetic seals designed with a higher flow resistance that that of fuel cell stacks 10, such that the majority of the fuel and oxidant flows through the fuel cell stacks, rather than through corner stack seal 43. Exemplary leaky seals are formed from a compressible cloth or a dense foam. In addition, the polygonal components may be stacked and arranged to form fuel cell stacks 10 prior to insertion in a vessel 62. Moreover, the fuel cell stacks 10 are self-aligning when stacked together due to the angles provided by the polygonal shape. For the fuel cell stacks 10 shown in FIG. 3, each planar fuel cell unit 20 is rectangular. For the fuel cell stack 10 of FIGS. 1 and 4, each planar fuel cell unit 20 is hexagonal. More particularly, for the embodiment shown in FIG. 1, each interconnect 22 defines four openings 24, which are arranged in two pairs 50 positioned on two opposing ends 52 of the interconnect 22, each pair defining an intake fuel manifold 251 and an exhaust fuel manifold 252, as indicated by arrows in FIG. 1. Beneficially, this configuration of openings 24 facilitates the symmetric distribution of fuel across the planar fuel cell unit 20. According to a more particular embodiment, the planar fuel cell unit 20 illustrated in FIG. 1 is a polygonal solid oxide fuel cell 20.

In order to close the stack 10 and to collect electrical current from the planar fuel cell units 20, the fuel cell stack 10 embodiment shown in FIG. 2, further includes a top end plate 12, which is disposed above an upper one of the planar fuel cell units 20, and a bottom end plate 14, which is disposed below a lower one of the planar fuel cell units 20. End plates 12, 14 are adapted for current collection, and exemplary top and bottom end plates 12, 14 are formed of ferritic stainless steel. In addition, end plates 12, 14 cap the fuel cell stack 10, preventing the fuel and oxidant from bypassing the fuel cell stack 10. The electric potential between the two end plates 12, 14 is the total voltage of the fuel cell stack 10 and equals the sum of the voltages of the individual cells 20.

Figure 9:
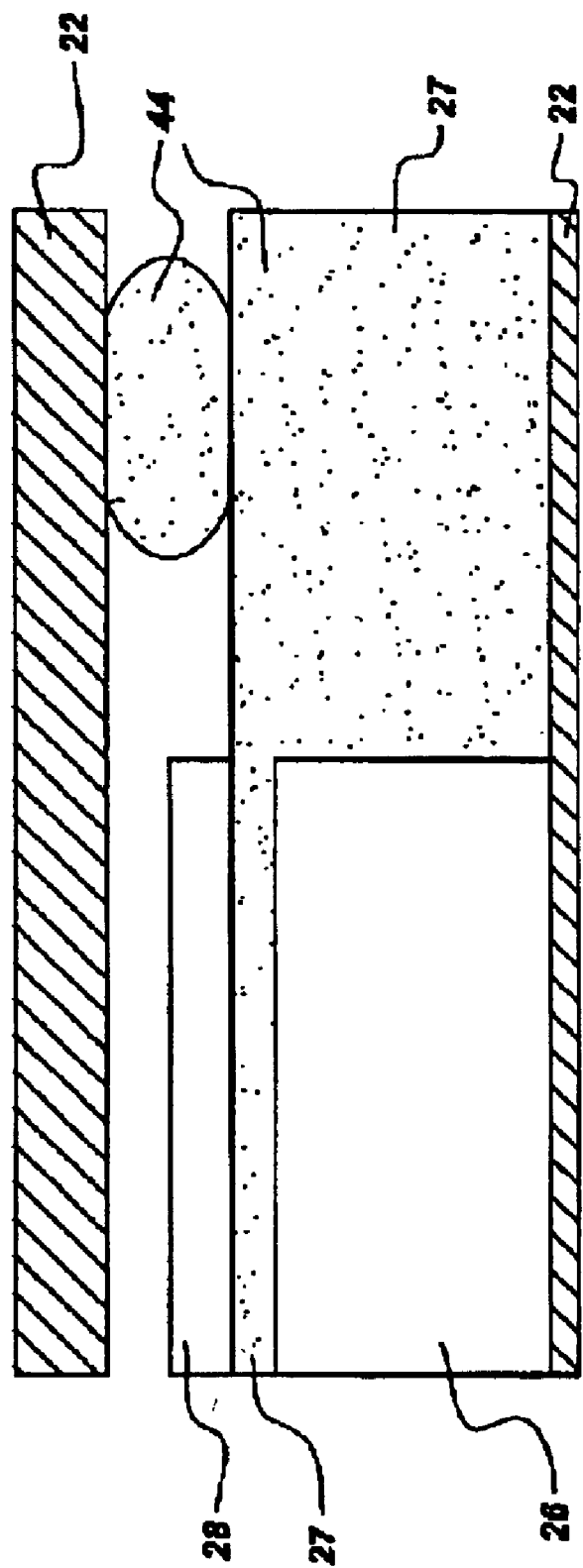
FIG. 9 depicts an exemplary sealing arrangement for the fuel cell unit of FIG. 1.

According to a particular embodiment, the electrolyte 27 is impermeable to the reactants (hereinafter "substantially solid") and is deposited onto anode 26 and the respective one of the interconnects 22, for example by plasma spray, physical vapor deposition, or chemical vapor deposition techniques. For this particular embodiment, the perimeter isolation seal 44 comprises the electrolyte 27 and is formed by the deposition of the electrolyte 27 on the respective interconnect 22. An exemplary perimeter isolation seal 44 comprising electrolyte 27 is shown in FIG. 9. For the embodiment of FIG. 9, the electrolyte is thicker in an inactive area for sealing, than in the active area. The electrolyte 27 can be made thicker, for example by masking during the deposition process prior to assembly of fuel cell unit 20. Beneficially, this perimeter isolation seal 44, formed by direct bonding of the electrolyte 27 to the respective interconnect 22, is substantially planar and thus does not require maintenance of a certain gap size. The substantially solid electrolyte 27 may also be bonded to the anode 26, for example by sintering, with an intermediary layer (not shown) deposited to enhance the bond between the interconnect 22 and the electrolyte 27. Other exemplary seals 44, 45 comprise glass, glass ceramics, metal, metal brazes, or combinations thereof deposited on the respective interconnect 22, for example, using one the deposition techniques listed above, to seal the electrolyte 27 to the respective interconnect 22. Beneficially, these seals 44, 45 are also substantially planar, thus obviating maintenance of a certain gap size.

Figure 3:
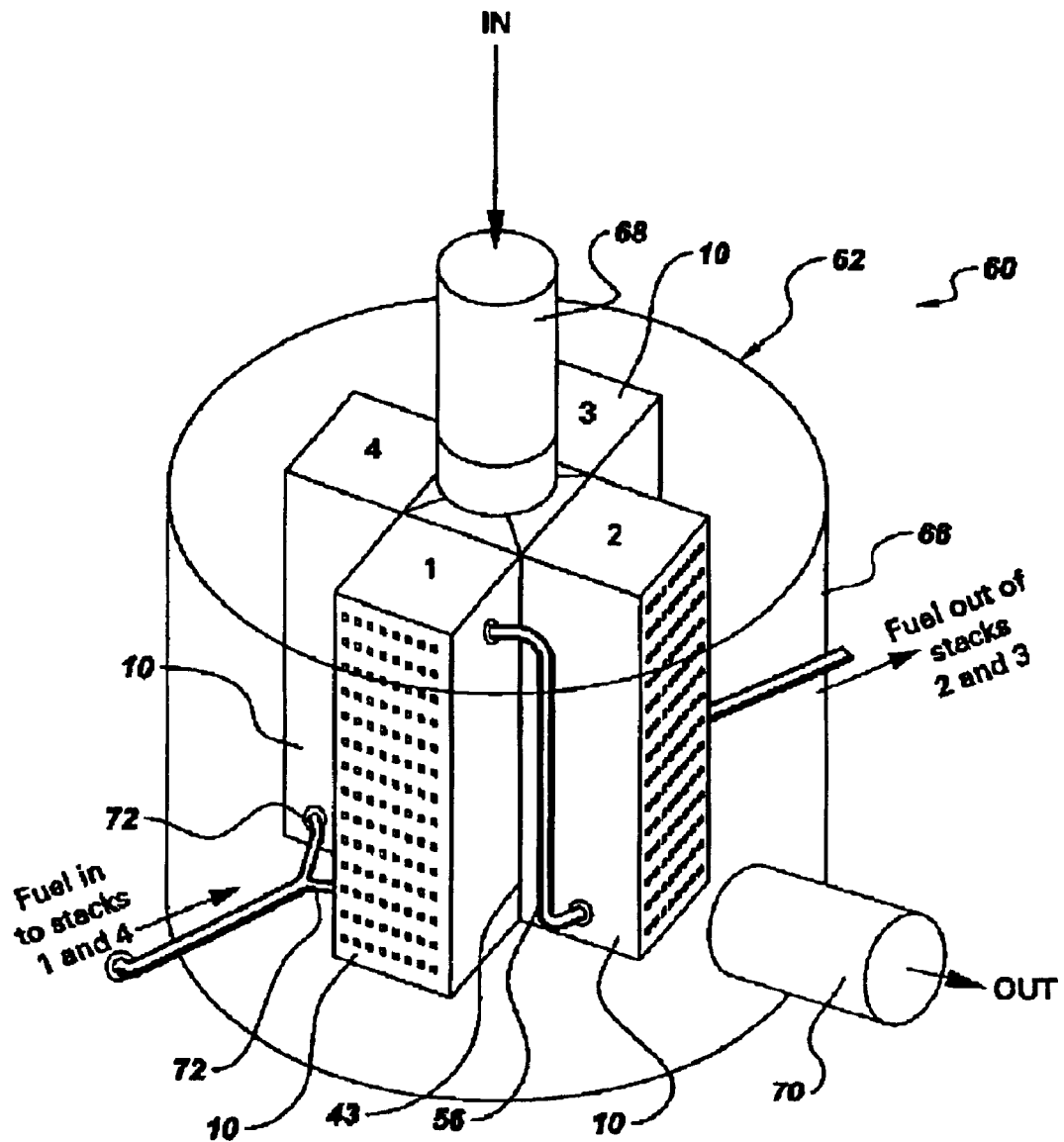
FIG. 3 shows an exemplary fuel cell module that includes a number of fuel cell stacks arranged in a rectangular configuration.
Figure 4:
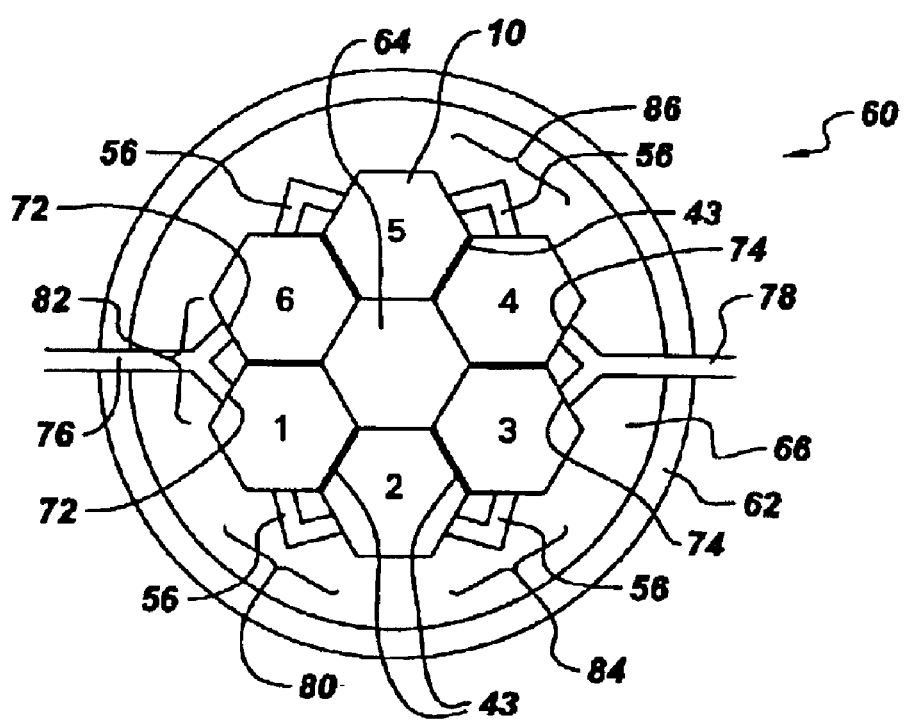
FIG. 4 is a top view of a hexagonal embodiment of the fuel cell module.
Figure 6:
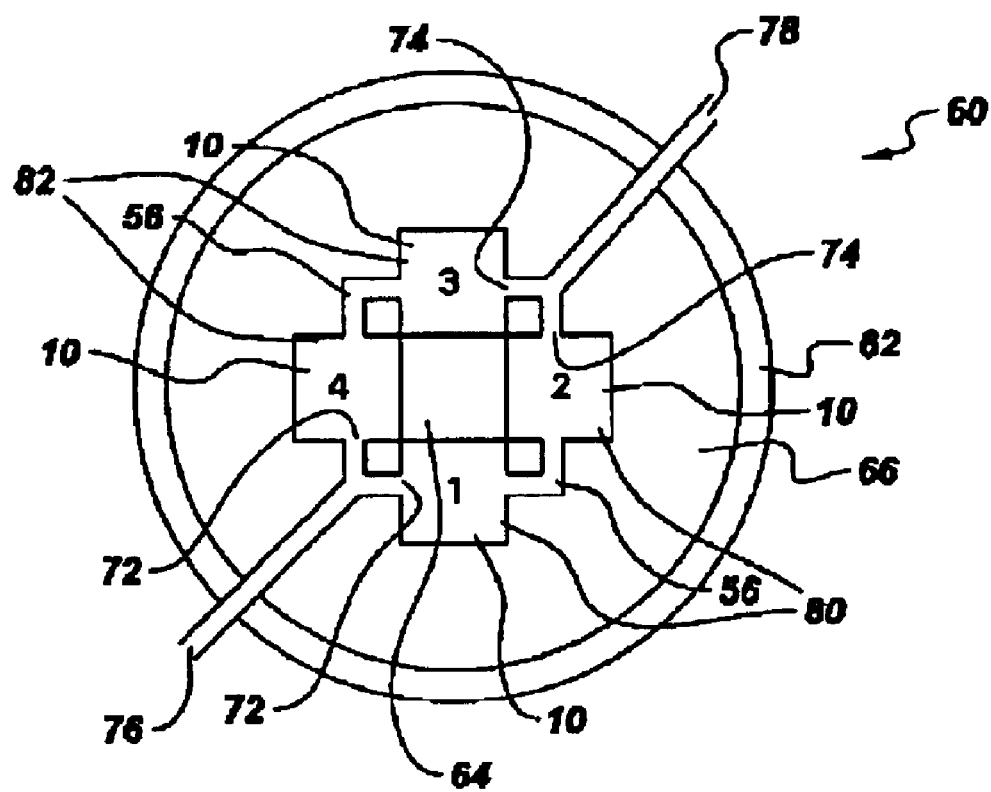
FIG. 6 is a top view of the fuel cell module of FIG. 3.
Figure 7:
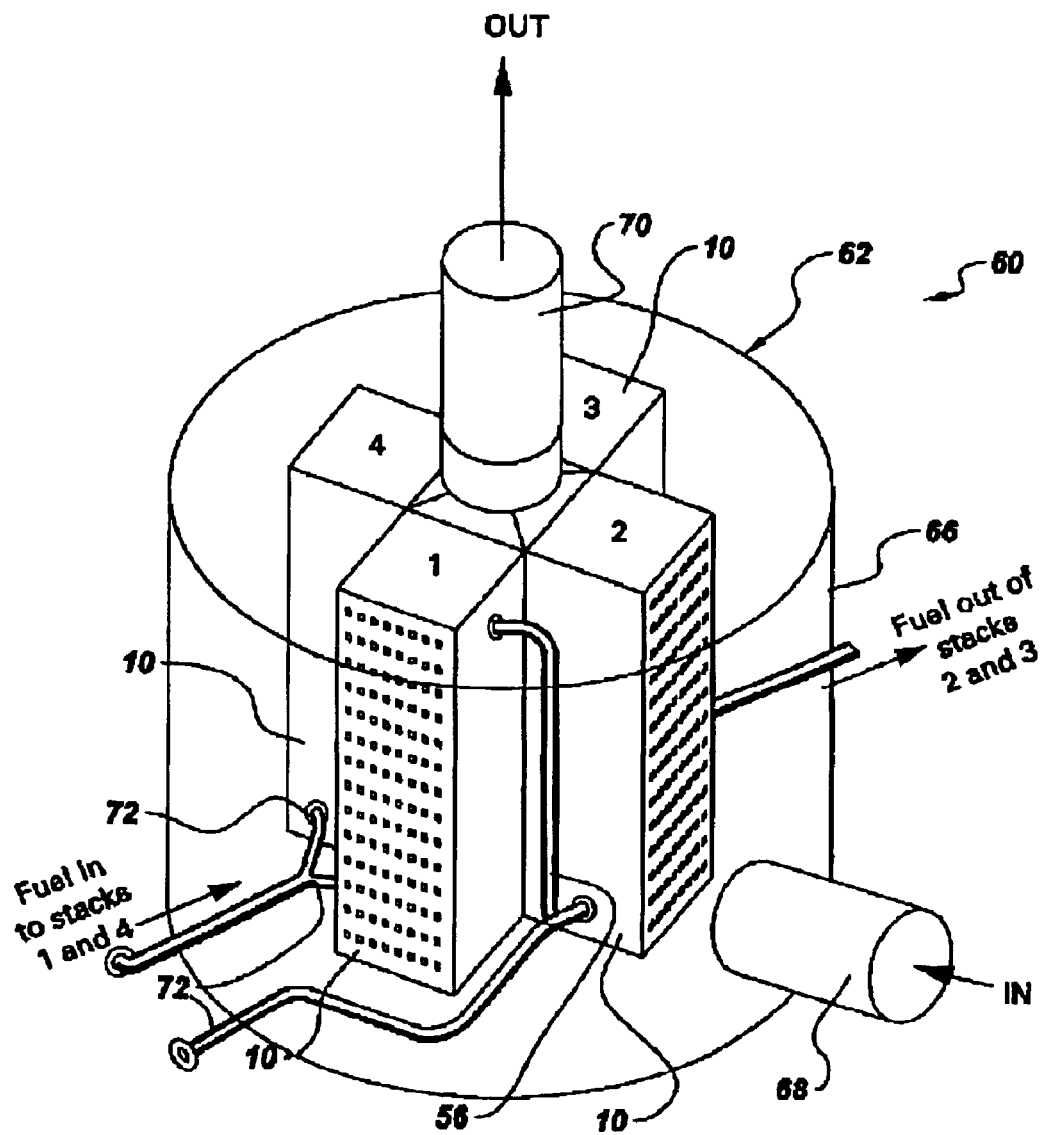
FIG. 7 shows another exemplary fuel cell module that includes a number of fuel cell stacks arranged in a rectangular configuration.

A fuel cell module 60 is described with respect to FIGS. 3, 4, 5, 7 and 8. As shown in FIGS. 3 and 7, fuel cell module 60 includes a vessel 62 having an inlet 68 and an outlet 70, which are configured to respectively receive and exhaust an oxidant, for example air. Fuel cell module 60 further includes at least three fuel cell stacks 10 arranged in a ring within vessel 62. As shown in FIG. 4, the fuel cell stacks 10 separate an inner and an outer volume 64, 66 of vessel 62, which are in fluid communication through the fuel cell stacks 10. At least one fuel cell stack 10 has a fuel inlet 72, and at least one fuel cell stack 10 has a fuel outlet 74, as indicated in top view in FIG. 6, for receiving and exhausting a fuel flow, respectively. Each fuel cell stack 10 includes at least two fuel manifolds 25, for receiving and exhausting the fuel flow, and further includes at least one planar, high-temperature fuel cell unit 20. As used here, the term "high-temperature" fuel cell refers to a fuel cell having an operating temperature of at least about 600° degrees Celsius, for example a molten carbonate or solid oxide fuel cell. As discussed above, planar, high-temperature fuel cell unit 20 includes an anode 26, a cathode 28, and an electrolyte 27 disposed between the anode 26 and the cathode 28.

Each fuel cell stack 10 further includes a number of seals 44, 45 for segregating the cathode 28 and the fuel flow through fuel manifolds 25 and for segregating the anode 26 and the oxidant. Beneficially, seals 44, 45 are compressive, as indicated in FIG. 1, as compared to the edge seals (not shown) found on typical planar stack designs (not shown).

Figure 5:
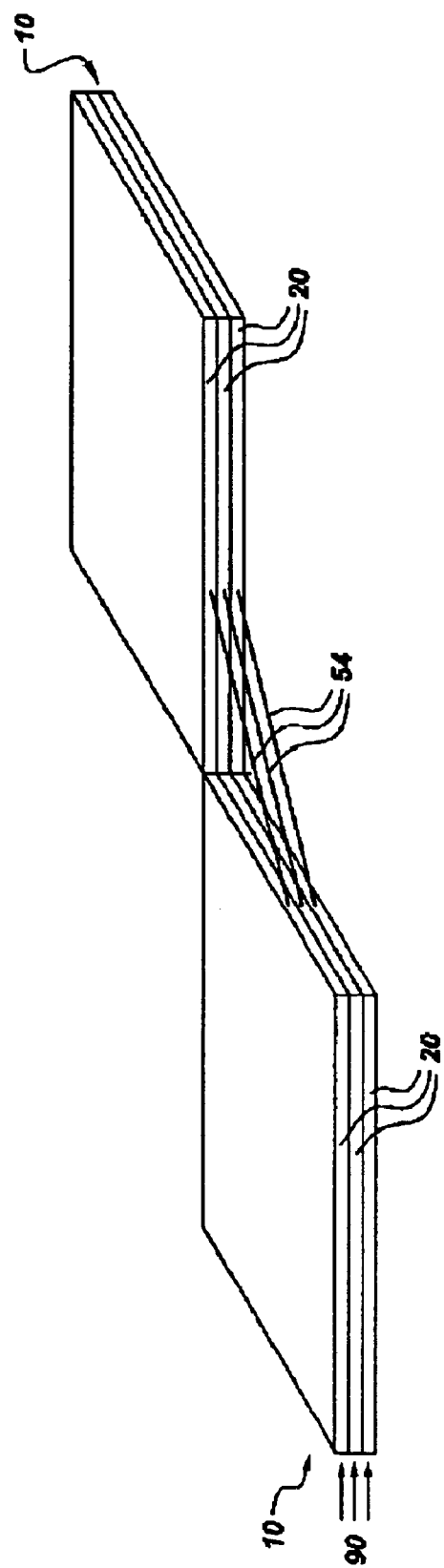
FIG. 5 depicts a number of electrical connections between two exemplary fuel cell stacks.

Fuel cell module 60 further includes a number of electrical connections 54 between fuel cell stacks 10 for electrically connecting each fuel cell stack 10 to at least one other fuel cell stack 10. For the exemplary embodiment shown in FIG. 8, the electrical connections 54 are provided by the interconnects 22. Jumper wires 54 could also be used to provide the electrical connections 54 between fuel cell stacks 10, as indicated in FIG. 5. Fuel cell stacks 10 may be connected in many ways, with different voltages and redundancies. For example, if the stacks 10 are electrically connected pairwise in parallel, and the two pairs of stacks 10 are electrically connected in series in the fuel cell module 60 of FIG. 3, then fuel cell module 60 provides a voltage equal to the sum of the voltages across a pair of connected stacks 10, with a two-fold redundancy, due to the parallel current path. Similarly, if all four stacks 10 are connected in parallel in the fuel cell module 60 of FIG. 3, then the voltage supplied by fuel cell module 60 is limited to the voltage of a single stack 10, but the redundancy is four-fold.

According to a particular embodiment, vessel 62 is a pressure vessel 62. Using a pressure vessel 62 is beneficial, in that pressure vessel 62 is configured to force the oxidant through fuel cell stacks 10, such that the oxidant contacts the porous cathodes 28. Specific pressures vary with power generation applications. However, one exemplary pressure vessel 62 is configured to operate in a range of about three (3) to about ten (10) atmospheres. Beneficially, use of a pressure vessel 62 provides higher pressure reactants, to achieve higher fuel cell 20 voltages. For the particular embodiment illustrated in FIG. 3, inlet 68 is configured to receive the oxidant into the inner volume 64 of vessel 62, and outlet 70 is configured to exhaust the oxidant from the outer volume 66 of vessel 62. For this embodiment, each planar, high-temperature fuel cell unit 20 is configured to convey the oxidant from the inner volume 64 to the outer volume 66 of the vessel 62. One benefit of the configuration shown in FIG. 3 is that fuel in the pipes between the stacks 10 is heated by the hot exhaust oxidant flow. For the embodiment illustrated in FIG. 7, the inlet 68 is configured to receive the oxidant into the outer volume 66 of vessel 62, and the outlet 70 is configured to exhaust the oxidant from the inner volume 64 of vessel 62. For the embodiment of FIG. 7, each planar, high-temperature fuel cell unit 20 is configured to convey the oxidant from the outer volume 66 to the inner volume 64 of the vessel 62. This latter embodiment cools the stacks 10 with incoming oxidant flow. Beneficially, both of these configurations facilitate enclosing stacks 10 within vessels 62 similar to those currently designed for gas turbine applications.

Figure 8:
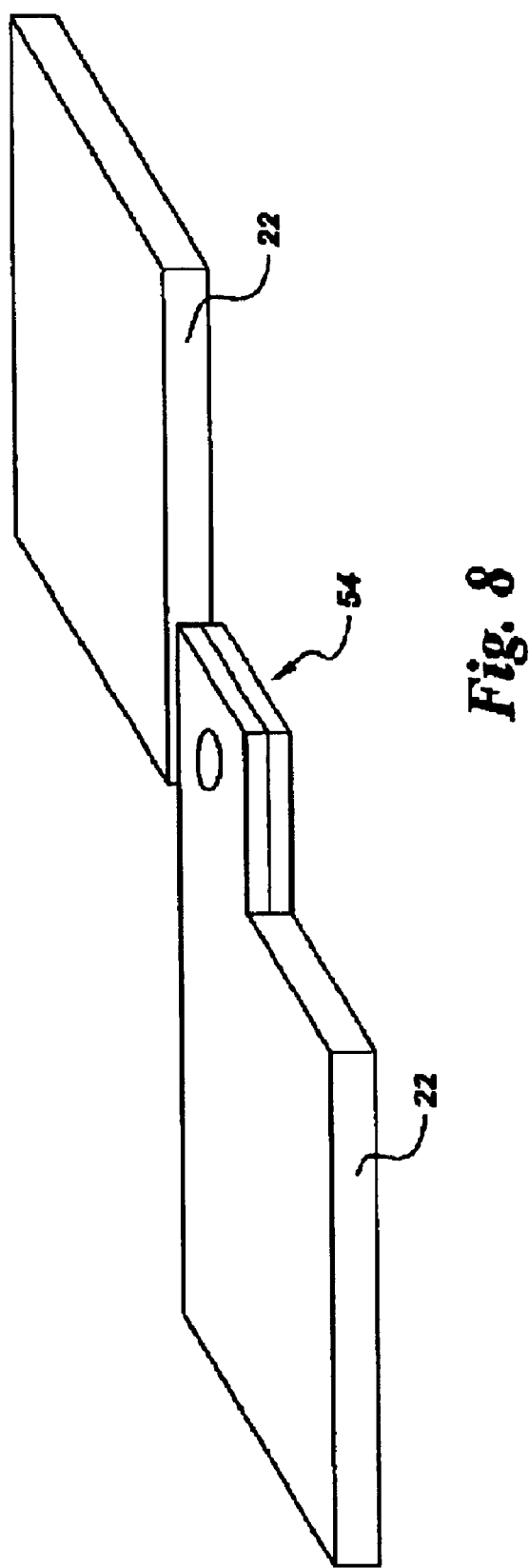
FIG. 8 shows an exemplary electrical connection between two interconnects on neighboring fuel cell stacks.

Exemplary planar high-temperature fuel cell units 20 are described above with respect to FIG. 1 and include interconnects 22 defining openings 24, which in turn define fuel manifolds 25, and including flow fields 34. As is also discussed above with reference to FIG. 1, for the exemplary planar high-temperature fuel cell units 20, the compressive seals 44, 45 include perimeter isolation seals 44 and interior isolation seals 45. For this embodiment, the electrical connections 54 are formed between interconnects 22, for example as shown in FIG. 8, with at least two interconnects 22 in respective fuel cell stacks 10 being electrically connected. Alternatively, interconnects 22 in respective fuel cell stacks are connected with external connectors 54, such as jumper wires 54.

In order to generate larger voltages, in a more particular embodiment, each fuel cell stack 10 includes a number of planar, high-temperature fuel cell units 20 arranged in a vertical stack. As indicated in FIG. 5, each planar high-temperature fuel cell unit 20 is disposed in a respective plane 90. For this embodiment, each electrical connection 54 is configured to connect interconnects 22 adjacent to at least two planar, high-temperature fuel cell units 20 in a respective plane 90, as indicated in FIG. 5. The electrical connections 54 may be provided by interconnects 22, as shown in FIG. 8. According to a more particular embodiment illustrated by FIG. 2, at least one pair of adjacent planar, high-temperature fuel cell units 20 within each of the fuel cell stacks 10 shares a respective interconnect 22, with the interconnect 22 being adjacent to and in both electrical connection and fluid communication with the anode 26 of one of the adjacent planar, high-temperature fuel cell units 20 and with the cathode 28 of the other adjacent planar, high-temperature fuel cell unit 20. For this particular embodiment, each of the interconnects 22, which is shared by adjacent planar, high-temperature fuel cell units 20, includes a flow field 34 on each side of the interconnect 22, to electrically connect and to supply fluid communication for the adjacent anode 26 and cathode 28 of the neighboring planar, high-temperature fuel cell units 20. Further, as discussed above with reference to FIG. 2, exemplary fuel cell stacks 10 include a top end plate 12 disposed above an upper one of the planar, high-temperature fuel cell units 20 and a bottom end plate 14 disposed below a lower one of the planar, high-temperature fuel cell units 20, for closing the stacks 10.

As noted above, the stacks 10 may be connected in a number of ways, depending on the desired power outputs and redundancies for fuel cell module 60. To provide a number of redundant current paths, in one embodiment the electrical connections 54 connect all of the planar high-temperature fuel cell units 20 within at least one of the planes 90. For example, for the four stack 10 configuration of FIGS. 3 and 7, four electrical connections 54 connect the four planar, high-temperature fuel cell units in one plane 90, providing a fourfold current path redundancy but supplying a voltage limited to the voltage across a single one of the four stacks 10. To increase the voltage output of fuel cell module 60 while providing a twofold current path redundancy, for another embodiment, an electrical connection 54 connects a pair 80 of fuel cell stacks 10, and another electrical connection 54 connects a second pair 82 of fuel cell stacks 10, for the four stack 10 configuration of FIGS. 3 and 7. To maintain a constant output, when one fuel cell unit 20 fails to conduct, the current in the remaining stacks at the failed cell unit's level of the parallel path must increase accordingly. For example, for two cell units so linked, the current in the surviving cell doubles. For a six stack configuration, each of the surviving cells within the parallel path must carry an additional twenty percent (20%) more current. The minimum number of stacks so connected will thus depend on the amount of additional current that individual fuel cell units 20 can tolerate, which in turn depends in part on the type of fuel cells used.

To transfer the exhaust of partially reacted fuel from one stack 10 to another stack 10, the fuel cell module 60 according to another embodiment, further includes at least one heat exchanger 56, which connects a pair 80 of fuel cell stacks 10. For FIG. 3, exemplary pairs 80 include the pair of fuel stacks 10 that are labeled 1 and 2 and the pair of fuel stacks 10 that are labeled 3 and 4. Exemplary heat exchangers 56 include a pipe 56 and a pipe 56 equipped with heat exchange enhancement features, such as fins (not shown), and heat exchanger 56 is configured to supply the fuel flow exhausted from one of pair of fuel cell stacks to a second of pair of fuel cell stacks. For the arrangement shown in FIG. 7, heat exchangers 56 are surrounded by oxidant from inlet 68, thereby beneficially cooling the exhaust fuel in pipes 56 and heating the oxidant entering the fuel cell stacks 10. In order to adjust the inlet temperature and fuel composition of the fuel entering the downstream stack 10 (for example, stack 2 in the stack 1 and 2 pair), more fuel may be added to the stream before it enters the down stream stack 10, for example as shown in FIG. 7. For another embodiment, the fuel cell stacks 10 are designed such that fuel utilization in the upstream stack 10 (for example, stack 1 in the stack 1 and 2 pair) is modified with respect to the fuel utilization in the downstream stack in order to optimize the overall fuel utilization obtained in the pair of stacks. Fuel utilization, namely the percentage of fuel passing through a given fuel cell unit 20 that is actually reacted by the fuel cell unit 20, is controlled using several design parameters, such as the distribution and concentration of reactants in the fuel cell unit 20.

For the particular embodiments of fuel cell module 60 shown in FIGS. 3, 6, and 7, fuel cell module 60 includes four fuel cell stacks 10 arranged in a ring and at least two heat exchangers 56, which connect the pair 80 of fuel cell stacks 10 and connect a second pair 82 of fuel cell stacks 10, respectively. For these embodiments, the planar, high-temperature fuel cell units 20 are rectangular, and each pair of fuel cell stacks includes a respective fuel inlet 72 for receiving the fuel flow and a respective fuel outlet 74 for exhausting the fuel flow. Exemplary planar, high-temperature fuel cell units 20 are planar SOFC units 20. In addition, fuel cell module 60 further includes a fuel feed line 76, which is configured to supply the fuel inlets 72, and a fuel exhaust line 78, which is configured to exhaust the fuel outlets 74. Fuel is supplied to fuel inlets 72, either prereformed or as a hydrocarbon, which is reformed within the stack, to form hydrogen ($H_2$) and carbon monoxide (CO). For example, the fuel is reformed within intake fuel manifold 251 or within the anode 26. In another example, the planar, high-temperature fuel cell units 20 incorporate an internal reformer (not shown) ahead of anode 26. Beneficially, reforming the hydrocarbon fuel within fuel cell units 20 enhances system efficiency.

Another embodiment of fuel cell module 60 is illustrated in FIG. 4 in top view. For this embodiment, fuel cell module 60 includes six fuel cell stacks 10 arranged in a ring and at least four heat exchangers 56 connecting the pair 80 of fuel cell stacks 10, and connecting a second, a third, and a fourth pair 82, 84, 86 of fuel cell stacks 10, respectively, as indicated in FIG. 4. As shown, the planar, high-temperature fuel cell units 20 are hexagonal. Exemplary planar, high-temperature fuel cell units 20 comprise planar SOFC units 20. Further, both the pair 80 and the second pair 82 of fuel cell stacks 10 include a respective fuel inlet 72 for receiving the fuel flow, and each of the third and fourth pairs 84, 86 of fuel cell stacks 10 includes a respective fuel outlet 74 for exhausting the fuel flow. In addition, fuel cell module 60 further includes a fuel feed line 76, which is configured to supply the fuel inlets 72, and a fuel exhaust line 78, which is configured to exhaust the fuel outlets 74. Fuel is supplied to fuel inlets 72, either prereformed or as a hydrocarbon, which is reformed within the stack, for example the planar high-temperature fuel cell units 20 may incorporate an internal reformer (not shown) ahead of anode 26, to form hydrogen ($H_2$) and carbon monoxide (CO) from a hydrocarbon fuel. The stacks 10 may be connected in a number of ways, depending on the desired power outputs and redundancies for fuel cell module 60. For one embodiment, the electrical connections 54 connect two of the fuel cell stacks 10 together in parallel, connect another two of the fuel cell stacks 10 together in parallel, and connect the remaining two of the fuel cell stacks 10 together in parallel. For another embodiment, the electrical connections 54 connect three of the fuel cell stacks 10 together in parallel, and connect another three of the fuel cell stacks 10 together in parallel. In another embodiment, the electrical connections 54 connect each of the fuel cell stacks 10 together, to provide a six-fold current path redundancy. As discussed above, exemplary electrical connections 54 are formed between the interconnects 22 of the respective stacks 10.

Although only certain features of the invention have been illustrated and described herein, many modifications and changes will occur to those skilled in the art. For example, it should be clear that the location of the fuel and air flow paths can be reversed, with the appropriate changes in the locations of the cathode and anode. Similarly, the fuel cell stack and fuel cell module could be assembled to have the oxidant internally manifolded and the fuel surrounding the stack. It is, therefore, to be understood that the appended claims are intended to cover all such modifications and changes as fall within the true spirit of the invention.

What is claimed is:

1. A fuel cell module comprising:
    a vessel having an inlet and an outlet, said inlet and outlet being configured to receive and exhaust an oxidant, respectively;
    at least three fuel cell stacks arranged in a ring within said vessel, said fuel cell stacks separating an inner and an outer volume of said vessel, said inner and outer volumes being in fluid communication through said fuel cell stacks, at least one of said fuel cell stacks having a fuel inlet and at least one of said fuel cell stacks having a fuel outlet for receiving and exhausting a fuel flow, respectively, wherein each fuel cell stack comprises at least two fuel manifolds for receiving and exhausting the fuel flow and further comprises at least one planar high-temperature fuel cell unit comprising an anode, a cathode, and an electrolyte disposed between said anode and cathode, each fuel cell stack further comprising a plurality of compressive seals for segregating said cathode and the fuel flow through said fuel manifolds and for segregating said anode and the oxidant;
    a plurality of electrical connections between said fuel cell stacks for electrically connecting each fuel cell stack to at least one other of said fuel cell stacks; and
    a plurality of corner stack seals, each of said corner stack seals being disposed along at least one of (a) an edge joining two of said fuel cell stacks and (b) a face joining two of said fuel cell stacks, wherein each of the corner stack seals comprises a leaky seal.

2. The fuel cell module of claim 1, wherein said vessel comprises a pressure vessel, and wherein said planar high-temperature fuel cell units comprise planar solid oxide fuel cell (SOFC) units.

3. The fuel cell module of claim 1, wherein said inlet is configured to receive the oxidant into said outer volume of said vessel and said outlet is configured to exhaust the oxidant from said inner volume of said vessel, and wherein each of said planar high-temperature fuel cell units is configured to convey the oxidant from said outer volume to said inner volume of said vessel.

4. The fuel cell module of claim 1, wherein said inlet is configured to receive the oxidant into said inner volume of said vessel and said outlet is configured to exhaust the oxidant from said outer volume of said vessel, and wherein each of said planar high-temperature fuel cell units is configured to convey the oxidant from said inner volume to said outer volume of said vessel.

5. The fuel cell module of claim 1, wherein each of said fuel cell stacks further comprises a plurality of interconnects, each of said interconnects defining at least two openings, each opening defining a respective one of said fuel manifolds, said fuel manifolds comprising at least one fuel intake manifold and at least one fuel exhaust manifold, and each interconnect further comprising at least one flow field for flowing a reagent,
    wherein each anode is positioned adjacent to a respective one of said interconnects and is configured to be in both electrical connection and fluid communication with said interconnect, and wherein said flow field of said interconnect is configured to guide the fuel flow from said at least one fuel intake manifold to said at least one fuel exhaust manifold,
    wherein each cathode is positioned adjacent to a respective one of said interconnects and is configured to be in both electrical connection and fluid communication with said interconnect, said flow field of said interconnect being configured to guide an oxidant flow across said interconnect, and
    wherein at least two of said interconnects in respective fuel cell stacks are electrically connected, providing said electrical connections between said fuel cell stacks.

6. The fuel cell module of claim 5, wherein said seals comprise:
    a perimeter isolation seal disposed around the respective one of said interconnects adjacent to said anode, said perimeter isolation seal being disposed on a side of said interconnect facing said anode and being configured to seal said electrolyte to said interconnect; and
    at least two interior isolation seals disposed on the respective one of said interconnects adjacent to said cathode and on a side of said interconnect facing said cathode, one interior isolation seal surrounding each of said openings and being configured to seal said electrolyte to said interconnect.

7. The fuel cell module of claim 6, wherein each of said corner stack seals is disposed along said edge joining two of said fuel cell stacks.

8. The fuel cell module of claim 6, wherein each of said corner stack seals is disposed along said face joining two of said fuel cell stacks.

9. The fuel cell module of claim 6, wherein each of said fuel cell stacks comprises a plurality of planar high-temperature fuel cell units arranged in a vertical stack, wherein each of said planar high-temperature fuel cell units is disposed in one of a respective plurality of planes, and wherein said interconnects of at least two of said planar high-temperature fuel cell units in a respective plane are electrically connected.

10. The fuel cell module of claim 9, wherein at least one pair of adjacent planar high-temperature fuel cell units within each of said fuel cell stacks share a respective one of said interconnects, said interconnect being adjacent to and in both electrical connection and fluid communication with said anode of one of said planar high-temperature fuel cell units and said cathode of the other of said planar high-temperature fuel cell units.

11. The fuel cell module of claim 9, wherein each of said fuel cell stacks further comprises:
    a top end plate disposed above an upper one of said planar high-temperature fuel cell units; and
    a bottom end plate disposed below a lower one of said planar high-temperature fuel cell units.

12. The fuel cell module of claim 9, wherein all of said planar high-temperature fuel cell units within at least one of said planes are electrically connected.

13. A fuel cell module comprising:
a vessel having an inlet and an outlet, said inlet and outlet being configured to receive and exhaust an oxidant, respectively;
at least three fuel cell stacks arranged in a ring within said vessel, said fuel cell stacks separating an inner and an outer volume of said vessel, said inner and outer volumes being in fluid communication through said fuel cell stacks, at least one of said fuel cell stacks having a fuel inlet and at least one of said fuel cell stacks having a fuel outlet for receiving and exhausting a fuel flow, respectively,
wherein each fuel cell stack comprises at least two fuel manifolds for receiving and exhausting the fuel flow and further comprises at least one planar high-temperature fuel cell unit comprising an anode, a cathode, and an electrolyte disposed between said anode and cathode, each fuel cell stack further comprising a plurality of compressive seals for segregating said cathode and the fuel flow through said fuel manifolds and for segregating said anode and the oxidant;
a plurality of electrical connections between said fuel cell stacks for electrically connecting each fuel cell stack to at least one other of said fuel cell stacks; and
at least one heat exchanger connecting a pair of said fuel cell stacks and configured to supply the fuel flow exhausted from one of said pair of fuel cell stacks to a second of said pair of fuel cell stacks.

14. The fuel cell module of claim 13 comprising four fuel cell stacks arranged in a ring and at least two heat exchangers connecting said pair of fuel cell stacks and connecting a second pair of fuel cell stacks, respectively,
wherein each of said planar high-temperature fuel cell units is rectangular, and wherein each of said pairs of fuel cell stacks includes a respective fuel inlet for receiving the fuel flow and a respective fuel outlet for exhausting the fuel flow, said fuel cell module further comprising:
a fuel feed line configured to supply said fuel inlets; and
a fuel exhaust line configured to exhaust said fuel outlets.

15. The fuel cell module of claim 14, wherein each of said pair and said second pair of said fuel cell stacks is electrically connected.

16. The fuel cell module of claim 14, wherein all of said fuel cell stacks are electrically connected.

17. The fuel cell module of claim 13, comprising six fuel cell stacks arranged in a ring and at least four heat exchangers connecting said pair of fuel cell stacks, and connecting a second, a third, and a fourth pair of fuel cell stacks, respectively,
wherein each of said planar high-temperature fuel cell units is hexagonal, wherein each of said pair and said second pair of fuel cell stacks includes a respective fuel inlet for receiving the fuel flow, and wherein each of said third and fourth pairs of fuel cell stacks includes a respective fuel outlet for exhausting the fuel flow, said fuel cell module further comprising:
a fuel feed line configured to supply said fuel inlets; and
a fuel exhaust line configured to exhaust said fuel outlets.

18. The fuel cell module of claim 17, wherein two of said fuel cell stacks are electrically connected, wherein another two of said fuel cell stacks are electrically connected, and wherein a remaining two of said fuel cell stacks are electrically connected.

19. The fuel cell module of claim 17, wherein three of said fuel cell stacks are electrically connected, and wherein another three of said fuel cell stacks are electrically connected.

20. The fuel cell module of claim 17, wherein all of said fuel cell stacks are electrically connected together.

21. The fuel cell module of claim 13, wherein each of said fuel cell stacks further comprises a plurality of interconnects, each of said interconnects defining at least two openings, each opening defining a respective one of said fuel manifolds, said fuel manifolds comprising at least one fuel intake manifold and at least one fuel exhaust manifold, and each interconnect further comprising at least one flow field for flowing a reagent,
wherein each anode is positioned adjacent to a respective one of said interconnects and is configured to be in both electrical connection and fluid communication with said interconnect, and wherein said flow field of said interconnect is configured to guide the fuel flow from said at least one fuel intake manifold to said at least one fuel exhaust manifold,
wherein each cathode is positioned adjacent to a respective one of said interconnects and is configured to be in both electrical connection and fluid communication with said interconnect, said flow field of said interconnect being configured to guide an oxidant flow across said interconnect, and
wherein at least two of said interconnects in respective fuel cell stacks are electrically connected, providing said electrical connections between said fuel cell stacks.

22. The fuel cell module of claim 21, wherein said seals comprise:
a perimeter isolation seal disposed around the respective one of said interconnects adjacent to said anode, said perimeter isolation seal being disposed on a side of said interconnect facing said anode and being configured to seal said electrolyte to said interconnect; and
at least two interior isolation seals disposed on the respective one of said interconnects adjacent to said cathode and on a side of said interconnect facing said cathode, one interior isolation seal surrounding each of said openings and being configured to seal said electrolyte to said interconnect.

23. The fuel cell module of claim 22, wherein each of said fuel cell stacks comprises a plurality of planar high-temperature fuel cell units arranged in a vertical stack, wherein each of said planar high-temperature fuel cell units is disposed in one of a respective plurality of planes, and wherein said interconnects of at least two of said planar high-temperature fuel cell units in a respective plane are electrically connected.

* * * * *